United States Patent [19]

Buysch et al.

[11] Patent Number: 5,059,643
[45] Date of Patent: Oct. 22, 1991

[54] STABILIZED POLYAMIDES

[75] Inventors: Hans-Josef Buysch, Krefeld; Hans-Georg Gelhaar; Erich Istel, both of Dormagen; Franz Zimmermann, Neuss, all of Fed. Rep. of Germany

[73] Assignee: Bayer Aktiengesellschaft, Leverkusen-Bayerwerk, Fed. Rep. of Germany

[21] Appl. No.: 61,430

[22] Filed: Jun. 12, 1987

[30] Foreign Application Priority Data

Jun. 24, 1986 [DE] Fed. Rep. of Germany ....... 3621038

[51] Int. Cl.$^5$ ............................ C08K 5/46; C08K 5/48
[52] U.S. Cl. ......................................... 524/83; 544/35; 544/38
[58] Field of Search ...................... 524/83; 544/35, 38

[56] References Cited

U.S. PATENT DOCUMENTS

| 3,399,108 | 8/1968 | Olson | 428/395 |
| 3,909,448 | 9/1975 | McGuigan et al. | 524/407 |
| 3,956,289 | 5/1976 | McGuigan et al. | 544/37 |
| 4,430,452 | 2/1984 | Buysch et al. | 544/35 |
| 4,532,275 | 7/1985 | Aito et al. | 428/395 |
| 4,565,834 | 1/1986 | Buysch et al. | 521/121 |
| 4,608,339 | 10/1986 | Yoakum et al. | 435/240.26 |

FOREIGN PATENT DOCUMENTS

| 0070436 | 1/1983 | European Pat. Off. | |
| 1103019 | 3/1961 | Fed. Rep. of Germany | 524/83 |
| 2156390 | 5/1973 | France | |
| 158638 | 12/1975 | Japan | 524/83 |
| 36544 | 4/1978 | Japan | 524/83 |
| 932066 | 7/1963 | United Kingdom | 524/83 |

Primary Examiner—Kriellions Morgan
Attorney, Agent, or Firm—Connolly and Hutz

[57] ABSTRACT

Polyamides are stabilized by phenothiazines.

21 Claims, No Drawings

STABILIZED POLYAMIDES

The present invention relates to stabilized polyamides which contain phenothiazine compounds as stabilizers.

Belgian Patent Specification 703,500 and DE-A-2,605,794 disclose that polyamides can be stabilized against thermal and oxidative degradation by addition of Cu compounds in combination with halogen compounds.

In this case, however, the possibility of employing such polyamides in a moist medium is greatly limited since these ionic stabilizers are rapidly extracted from the polyamide by water or aqueous liquids. This applies particularly for polyamides which are processed into yarns, monofilaments and industrial fabrics and accordingly have a large surface area. Such products are subjected to extremely degrading influences, for example when they are employed as high-speed sieves for obtaining paper from the aqueous pulp under continuous extreme tensile strain and compressive stress at elevated temperature and, sometimes, in the presence of oxidizing bleaches.

Ciba-Geigy Company Publication No. 770.512/d/Str./10 and Publication No. 770.620/d/Str./10 disclose that phenolic antioxidants can be used. Under the conditions outlined above, these have advantages compared to the ionic compounds, and, in particular, they are more stable towards extraction.

Products of the condensation of acetone and diphenylamine, according to DE-A- 1,152,252, and oligomeric diphenylamine derivatives, according to EP-A-84,108, are employed for stabilization.

However, the protection against oxidation achieved using these is inadequate. The object of the present invention was thus to provide improved polyamides.

The invention relates to polyamides having at least one stabilizer, characterized in that at least one phenothiazine, having a molecular weight of at least 400, particularly at least 500, is included as stabilizer. In a preferred embodiment, the phenothiazines correspond to the following general structure I

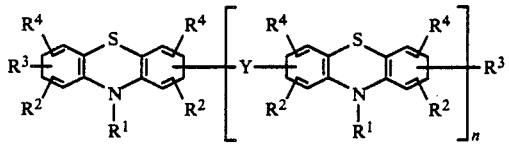

in which
$R^1$ denotes $C_1-C_6$-alkyl, $C_5-C_6$-cycloalkyl, $C_3-C_5$-alkenyl, preferably $C_7-C_{10}$-aralkyl and particularly preferably H, $R^2$, $R^4$ and $R^5$ are identical or different and denote H, $CH_3$ or $C_2H_5$, preferably H, $R^3$ denotes H, $C_4-C_{12}$-alkyl, $C_6-C_9$-cycloalkyl, $C_5-C_9$-alkylcycloalkenyl, $C_5-C_9$-cycloalkylalkenyl and $C_7-C_{12}$-aralkyl, preferably

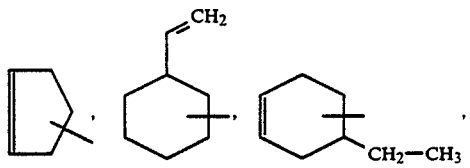

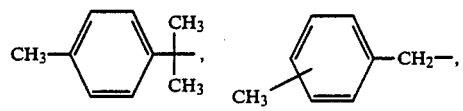

isononyl, cyclohexyl and methylcyclohexyl, but particularly H, benzyl, styryl, α-methylstyryl, tert.-butyl, tert.-amyl,

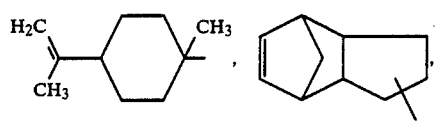

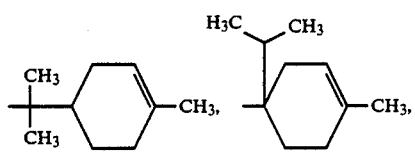

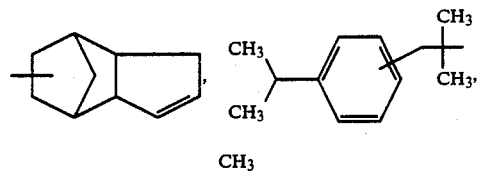

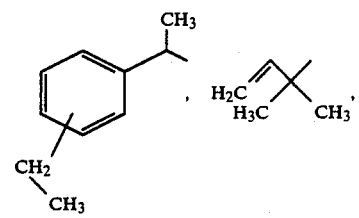

n denotes an integer, particularly from 1-29, preferably from 1-19, and
Y denotes

where $R^5$ has the abovementioned meaning, but is preferably H, and where $R^6$ is $C_1-C_7$ (preferably $C_1-C_4$) alkyl, cyclohexyl, cyclohexyl or aryl,
Y is furthermore preferably:

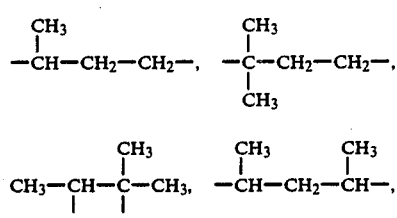

-continued

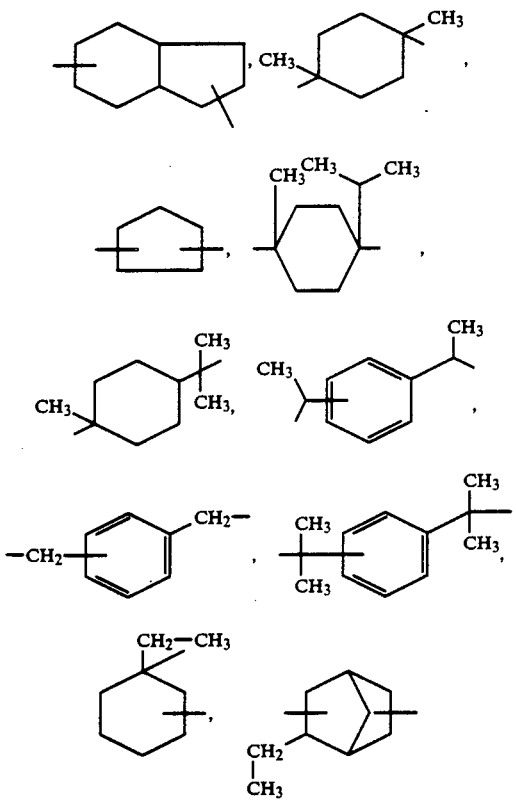

or —S— or —CH₂—, preferably —CH₂—, where, in the case of n>1, the Y group preferably denotes, up to 50 mol %, —S— or —CH₂—, and
where, in the formula I, a multiply occurring substituent can adopt another from the meanings mentioned in the case of each substitution. Each substituent may be substituted, particularly by the substituents which are conventional in stabilizers in the polyamide field, for example by an ether or thioether.

In another preferred embodiment, the phenothiazine corresponds to the following general structure II

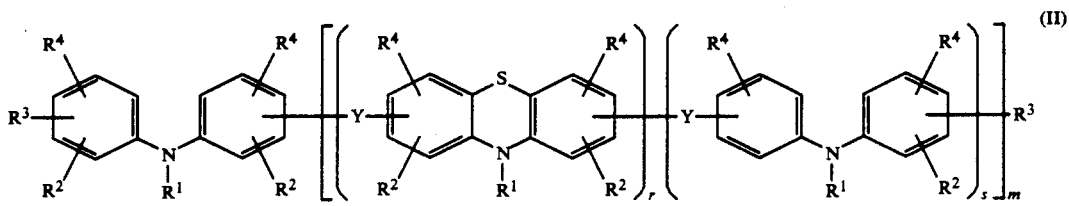

in which
the substituents have the abovementioned meaning, and
r, s and m are identical or different and denote an integer, preferably 1 to 29, in particular 1 to 9, and where a multiply occurring substituent can adopt another of the meanings mentioned in the case of each substitution.

Surprisingly, the phenothiazines to be used according to the invention are excellent stabilizers against oxidative degradation for polyamides. Although EP-A-70,436 has already disclosed polyurethane foams containing phenothiazines, there is no reference to polyamides.

Polyamides which are provided with the phenothiazines to be used according to the invention retain their good mechanical properties for significantly longer than the polyamides which are stabilized with the abovementioned phenol and diphenylamine derivatives, even under extreme conditions.

In general, they are added to the polyamides in amounts from 0.05-8% by weight, preferably 0.1-5% by weight, particularly preferably 0.2-3% by weight. They can be incorporated by conventional techniques, for example by mixing in an extruder, or by applying to the granulates, adding the stabilizer to the entire amount of monomers before the polycondensation, and finally via a stabilizer concentrate.

In the context of the present invention, polyamides are, in particular, aliphatic polyamides, for example from laurinlactam, oenantholactam, ε-aminoundecanoic acid, hexamethylenediamine and azeleic acid etc., but particularly from caprolactam, hexamethylenediamine and adipic acid, the copolymers thereof and copolymers with other polyamides, and mechanical mixtures of these products.

The polyamides may contain, in addition to the phenothiazines, further conventional additives, such as fillers and reinforcing agents, lubricants and mould-release agents, nucleating agents, pigments, dyestuffs, antistatic agents, plasticizers and UV stabilizers, in known amounts.

The polyamides which are stabilized according to the invention are excellently suited for the production of industrial silk for fishing nets, drive belts, conveyor belts, tire cord or moulded articles, particularly monofilaments which are subjected to thermal load with unhindered access by air, oxygen and other oxidants, such as bleaches, in the press of a paper-making machine.

The phenothiazines to be used according to the invention may be prepared by the processes specified in EP-A 70,436.

Examples of particularly preferred phenothiazines are given below:

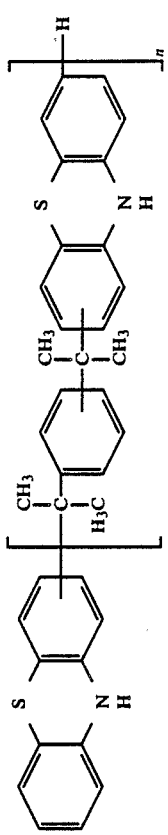

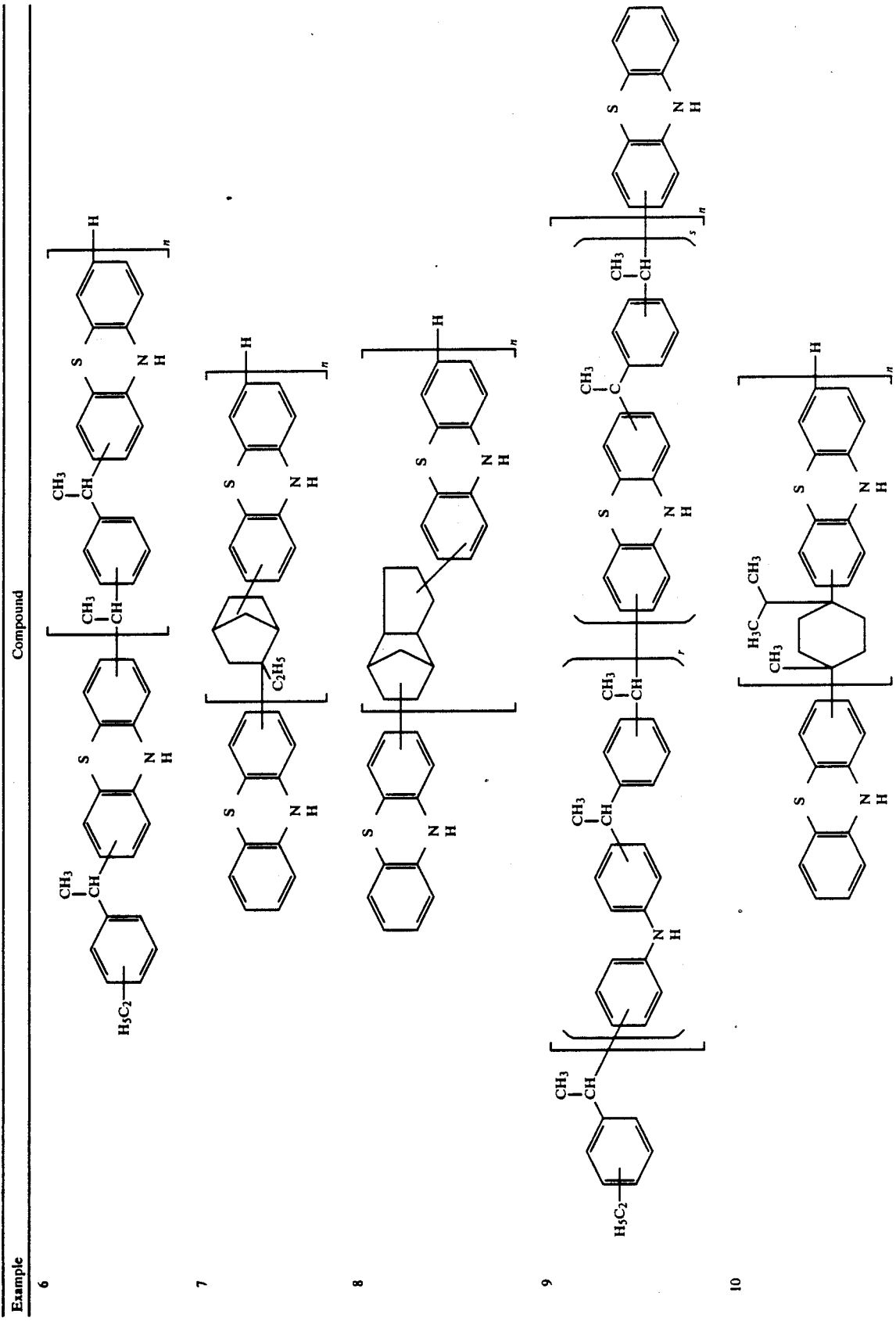

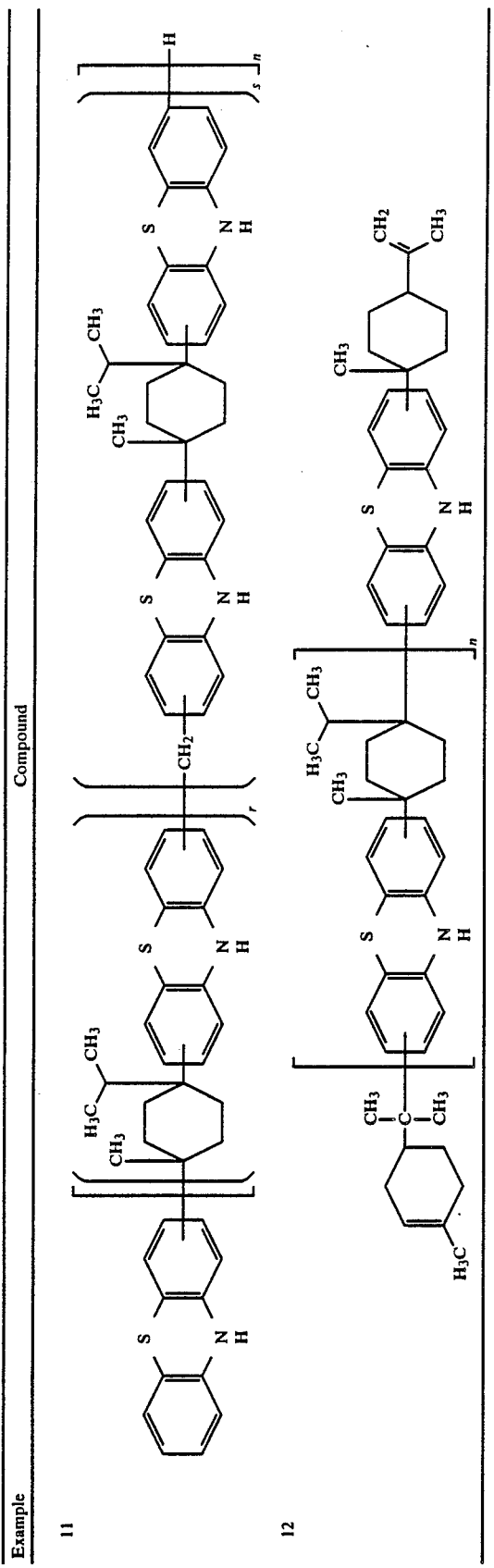

The phenothiazines to be used according to the invention may be incorporated in a conventional fashion, for example using an adhesion promoter.

EXAMPLE

In the following examples, the phenothiazines were incorporated as follows: 0.15% by weight (relative to the product to be stabilized) of a hydroxyalkylated phenol as adhesion promoter are applied to the polyamide granules, which are located in a tumble-mixer. The granules and the adhesion promoter are mixed for a few minutes. 0.3% by weight of the stabilizer are then added in portions, and the whole is finally homogenized for 2 hours at room temperature.

A mixture of 135.0 kg of caprolactam, 15.0 kg of water and 15.0 kg of stabilizer are homogenized, in a batch container which is equipped with a high-speed stirrer, with 0.15% by weight of chain-length regulator (acetic acid), and subsequently transferred to a polymerization autoclave. The mixture is heated, with stirring, to 260° C. within about 1-1.5 hours at a steam-pressure of 4-5 bar. After 3 hours, the pressure in the autoclave is released and the melt is subsequently condensed, with stirring, using a dry 50 liters/hour stream of nitrogen. The melt is then processed into strands on a casting belt and granulated.

The following were employed:

Stabilizer Example 10

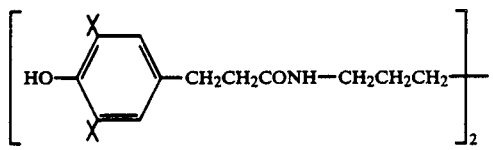

corresponding to the abovementioned Ciba-Geigy Company Publication No. 770.512/d/Str./10

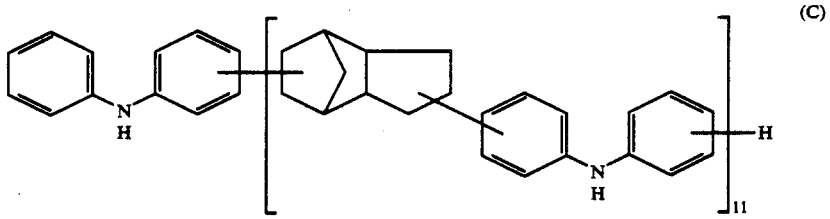

corresponding to Euopean Patent Specification 84,108, Example 6

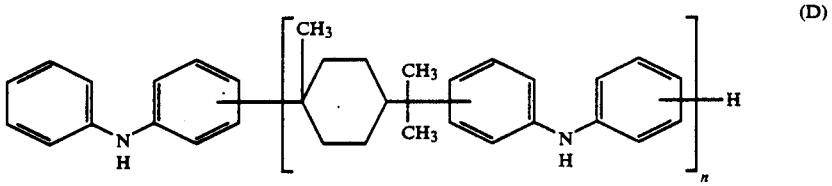

corresponding to European Patent Specification 84,108, Example 5

EXAMPLE 1

Each of the stabilizers was employed to a proportion of 0.3% by weight, the polyamide (PA 6 having $n_{rel}$ about 4.0) was spun, in a laboratory experiment, into monofilaments of diameter 0.20, and the filaments were aged in a fan-assisted heating cabinet at 185° C. to 190° C., the position of the samples being constantly changed in order to compensate for temperature differences. The tear strength of the starting material and of the aged filaments was measured. The tear strength loss (average of 20 individual measurements in each case) was specified in % relative to the initial value, i.e. the greater the figure specified, the greater the tear strength loss and the worse the stabilizer effect.

| Stabilizer | Initial value* | Test results: 2 h/ 185° C. | 4 h/ 185° C. | 2 h/ 190° C. | 4 h/ 190° C. |
|---|---|---|---|---|---|
| A | 1578 | −4 | −5 | −10 | −5 |
| B | 1526 | 2 | 11 | 5 | 16 |
| C | 1524 | 16 | 41 | 24 | 58 |
| D | 1658 | 2 | 5 | 0 | 7 |

*The tear strength is specified in (cN).

The superior action of the stabilization, according to the invention, using the product A from Example 10 is shown clearly from these results. The negative figures indicate that it was even possible to observe an increase in the tear strength after the specified ageing, whereas the comparison mixtures all deteriorated, apart from one case in the case of D.

EXAMPLE 2

The stabilizers A and B were used in a pilot-plant experiment for the production of monofilaments (PA 6, $\eta = 4.0$). 0.3% by weight were also added.

These monofilaments were likewise initially aged for 4 hours at 190° C., but also for 13 days at 160° C. The results obtained are located in the following table. The % loss of tear strength is also shown here.

| Stabilizer | 4 h/190° | 13 d/160° |
|---|---|---|
| A | 17 | 35 |
| B | 20 | 90 |

These data likewise clearly show the superiority of product A, particularly in the case of long treatment.

Finally, an extraction comparison between stabilizers A and B in monofilaments (diameter 0.2 mm) from the abovementioned pilot-plant experiment over 5 hours at 95° C. in neutral water shows no extractability for stabilizer A; in contrast, stabilizer B is always eluted to about 30%.

We claim:

1. A polyamide containing one or more stabilizers which include at least one phenothiazine having a molecular weight of at least 400 and which corresponds to the formula

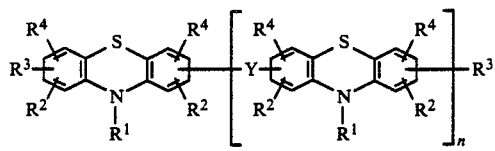

in which $R^1$ denotes a $C_1$-$C_6$-alkyl, $C_5$-$C_6$-cycloalkyl, $C_3$-$C_5$-alkenyl or $C_7$-$C_{10}$-aralkyl or a hydrogen atom, $R_2$ and $R_4$ are identical or different and denote a hydrogen atom, a methyl or ethyl, $R^3$ denotes a hydrogen atom, a $C_4$-$C_{12}$-alkyl, $C_6$-$C_9$-cycloakyl, $C_5$-$C_9$-alkylcycloalkenyl, $C_5$-$C_9$-cycloalkylalkenyl or $C_7$-$C_{12}$-aralkyl, n is an integer from 1 to 29 and
Y denotes

where $R^5$ has any of the meanings given for $R^2$ and where $R^6$ is a $C_1$-$C_7$-alkyl, cyclohexyl, cyclohexenyl or aryl, or
Y denotes

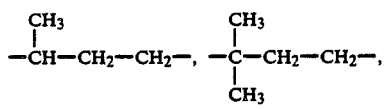

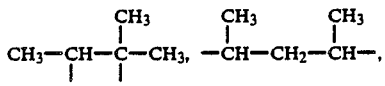

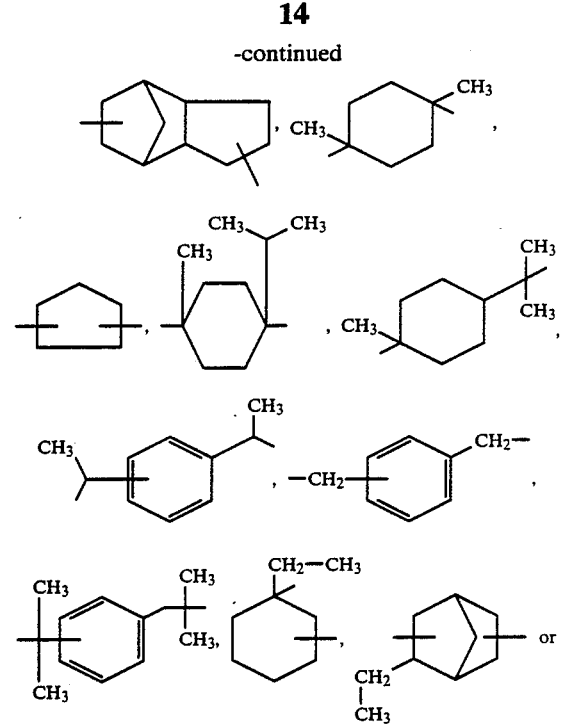

Y denotes —S— or —CH$_2$—, and
each of the multiply occurring substituents $R^2$ and $R^4$ as well as $R^1$, $R^3$ and Y when n is >1, independently have any of the meanings specified therefor.

2. A polyamide containing one or more stabilizers which include at least one phenothiazine having a molecular weight of at least 400 which corresponds to the formula

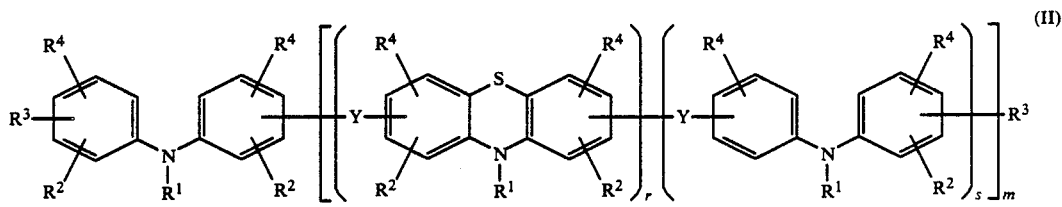

in which $R^1$ denotes a $C_1$-$C_6$-alkyl, $C_5$-$C_6$-cycloalkyl, $C_3$-$C_5$-alkenyl or $C_7$-$C_{10}$-aralkyl or a hydrogen atom, $R_2$ and $R_4$ are identical or different and denote a hydrogen atom, a methyl or ethyl, $R^3$ denotes a hydrogen atom, a $C_4$-$C_{12}$-alkyl, $C_6$-$C_9$-cycloalkyl, $C_5$-$C_9$-alkylcycloalkenyl, $C_5$-$C_9$-cycloalkylalkenyl or $C_7$-$C_{12}$-aralkyl, r, s, and m are each from an integer from 1 to 29 and
Y denotes

where $R^5$ has any of the meanings given for $R^2$ and where $R^6$ is a $C_1$-$C_7$-alkyl, cyclohexyl, cyclohexenyl or aryl, or
Y denotes

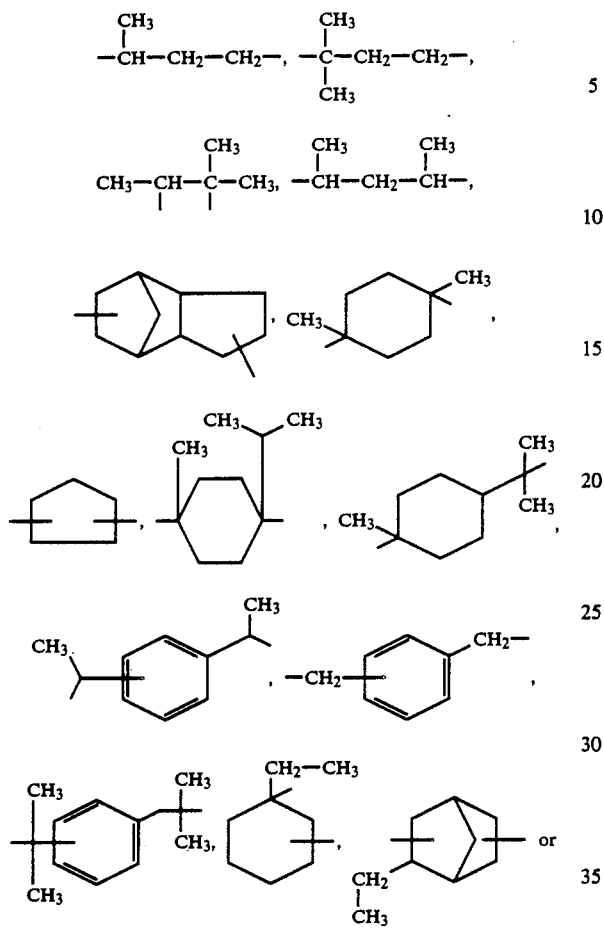

Y denotes —S— or —CH₂—, and
each of the multiply occurring substituents $R^2$ and $R^4$, as well as $R^1$, $R^3$ and Y when n is >1, independently have any of the meanings specified therefor.

3. A polyamide according to claim 1, in which $R^1$ denotes a $C_7$–$C_{10}$-aralkyl radical or a hydrogen atom.

4. A polyamide according to claim 2, in which $R^1$, $R^2$, $R^4$ and $R^5$ denote hydrogen atoms.

5. A polyamide according to claim 1, in which Y denotes

in which $R^5$ denotes a hydrogen atom and $R^6$ denotes a $C_1$–$C_4$ alkyl radical, or Y denotes —CH₂—.

6. A polyamide according to claim 1, in which n is an integer from 1 to 29.

7. A polyamide according to claim 5, in which n is an integer from 1 to 19.

8. A polyamide according to claim 1, in which n is >1 and Y denotes up to 50 mol % of the radicals —S— or —CH₂—.

9. A polyamide according to claim 1, in which R₃ denotes a hydrogen atom, a benzyl, styryl, α-methylstyryl, tert.-butyl or tert.-amyl radical, or

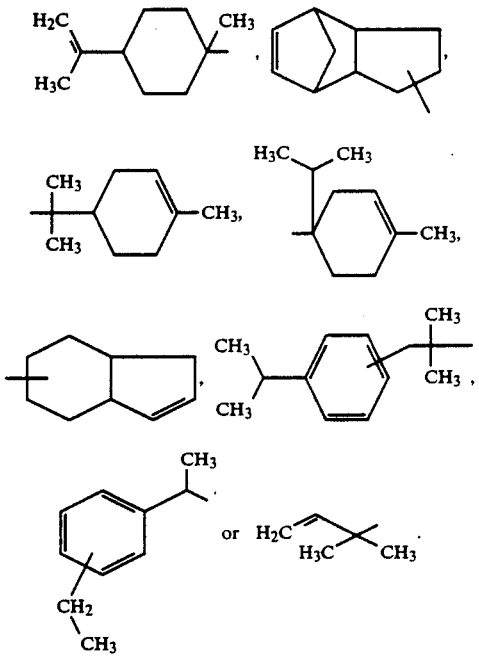

10. A polyamide according to claims 1, in which R3 denotes

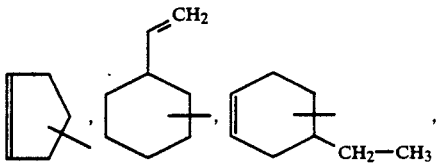

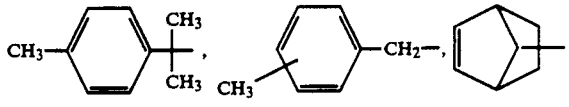

or an isononyl, cyclohexyl and methylcyclohexyl radical.

11. A polyamide according to claim 2, in which r, s and m are, independently, an integer from 1 to 29.

12. A polyamide according to claim 2, in which r, s and m are, independently, an integer from 1 to 9.

13. A polyamide according to claim 1 in which
$R^1$ denotes a hydrogen atom,
$R^2$ and $R^4$ denote hydrogen atoms
$R^3$ denotes a hydrogen atom, a benzyl, styryl, α-methylstyryl, tert.-butyl or tert.-amyl radical, or

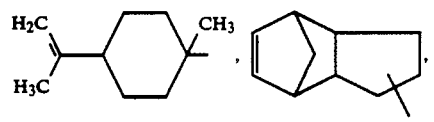

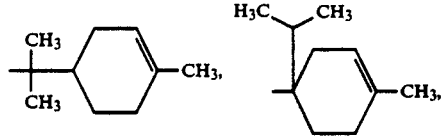

-continued

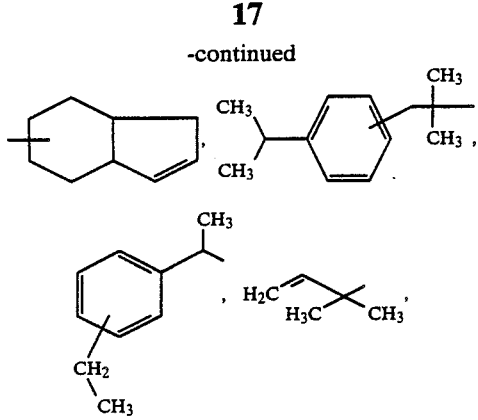

n is 1 to 29 and
Y denotes

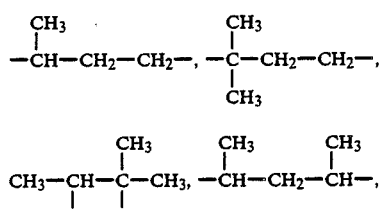

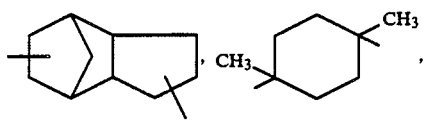

-continued

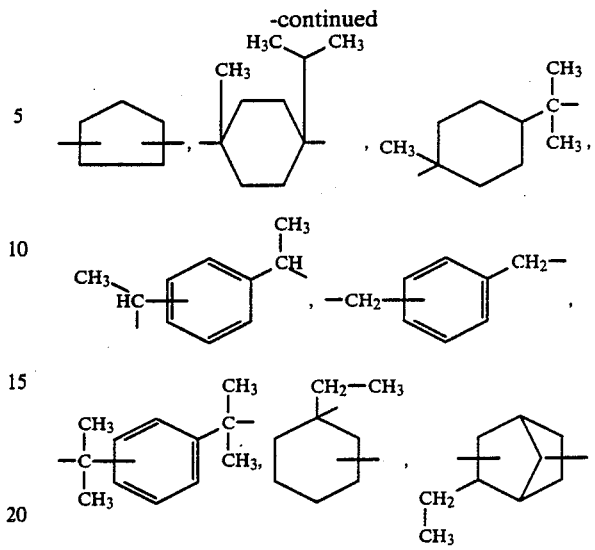

and in which, when n is >1, each of the multiply occurring substituents $R^3$ and Y independently have any of the meanings specified therefor.

14. A polyamide according to claim 1 which contains 0.1 to 5% by weight of the phenothiazine.

15. A polyamide according to claim 14 which contains 0.2 to 3% by weight of the phenothiazine.

16. A polyamide according to any of claim 1, in which the polyamide itself is a polyamide from caprolactam, hexamethylenediamine and adipic acid.

17. Polyamide fibres whenever formed of a polyamide according to claim 1.

18. Polyamide monofilaments whenever formed of a polyamide according to claim 1.

19. A polyamide according to claim 1 wherein n is an integer from 1-19 in the formula of said phenothiazine.

20. A polyamide according to claim 2 wherein r, s and m are each an integer from 1 to 9.

21. A polyamide according to claim 1 which contains at least one phenothiazine of the formula

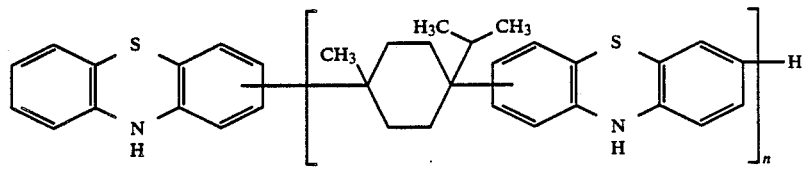

wherein n is an integer from 1 to 29.

* * * * *